United States Patent
Jorgensen et al.

[15] 3,676,747

[45] *July 11, 1972

[54] PRINTED CIRCUIT CARD ARRANGEMENT

[72] Inventors: Adam A. Jorgensen, Pittsford; William Bentley, Penfield; Edward Urycki, Buffalo, all of N.Y.

[73] Assignee: Stromberg-Carlson Corporation, Rochester, N.Y.

[ * ] Notice: The portion of the term of this patent subsequent to Feb. 23, 1988, has been disclaimed.

[22] Filed: Feb. 19, 1971

[21] Appl. No.: 117,026

Related U.S. Application Data

[63] Continuation-in-part of Ser. No. 809,072, March 21, 1969.

[52] U.S. Cl. ....................317/101

[51] Int. Cl. ....................H05k 5/02, H05k 5/04

[58] Field of Search ....................317/99, 101, 101 DH, 101 CW, 317/101 CM, 101 CB; 211/169

[56] References Cited

UNITED STATES PATENTS

| | | | |
|---|---|---|---|
| 2,928,555 | 5/1960 | Childs et al. | 211/169 |
| 2,945,989 | 7/1960 | Vogel et al. | 317/101 DH |
| 3,274,449 | 9/1966 | Pioch | 317/101 |
| 3,356,905 | 12/1967 | Linn | 317/101 |
| 3,566,193 | 2/1971 | Jorgensen et al. | 317/101 DH |

*Primary Examiner*—Lewis H. Myers
*Assistant Examiner*—U. Weldon
*Attorney*—Charles C. Krawczyk

[57] ABSTRACT

A printed circuit card arrangement including a printed circuit card and a rigid frame secured thereto, and a module of printed circuit card arrangements supported on a gate in spaced parallel arrangement.

28 Claims, 23 Drawing Figures

A.A. JORGENSON
R.W. BENTLEY
E. URYCKI
INVENTORS

BY Charles C. Krawczyk

ATTORNEY

A. A. JORGENSON
R.W. BENTLEY
E. URYCKI
INVENTORS

BY

ATTORNEY

A.A. JORGENSEN
R.W. BENTLEY
E. URYCKI
INVENTORS

BY

ATTORNEY

A. A. JORGENSON
R. W. BENTLEY
E. URYCKI
INVENTORS

BY [signature]
ATTORNEY

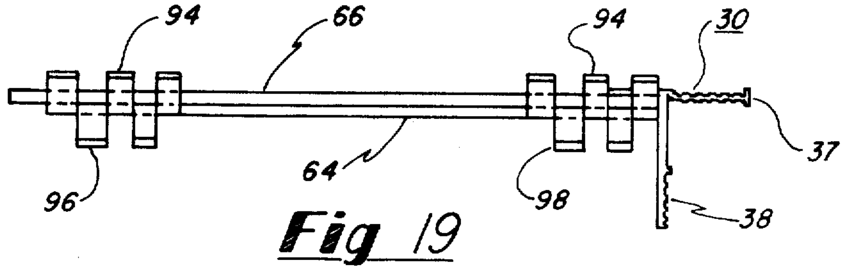
Fig 19
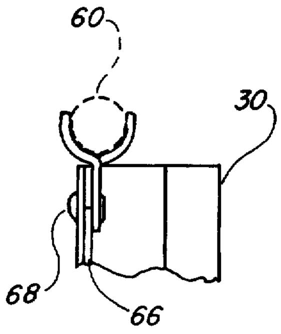
Fig 18
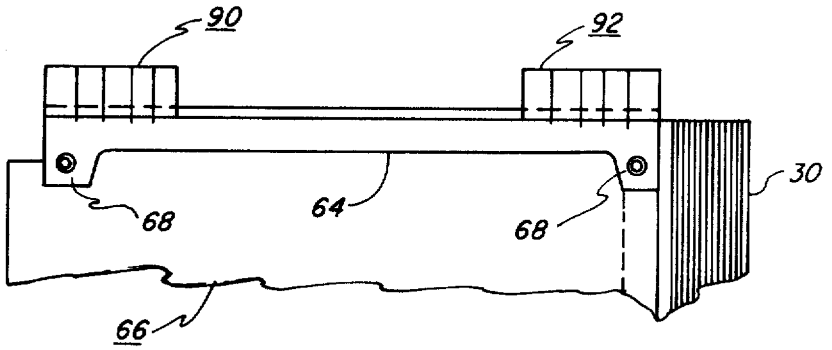
Fig 17
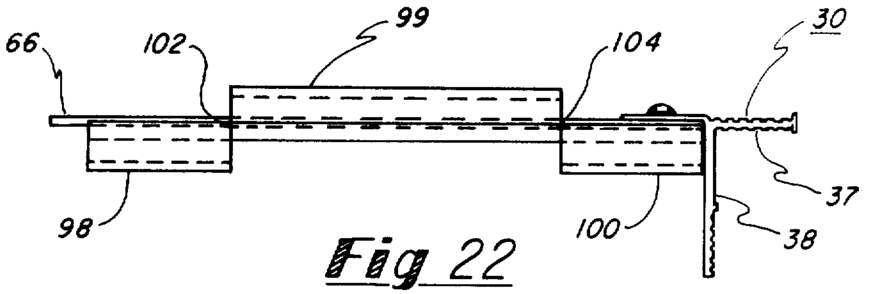
Fig 22
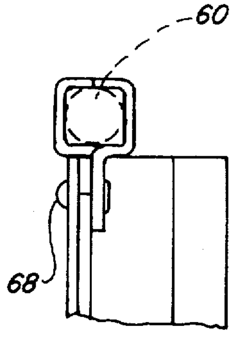
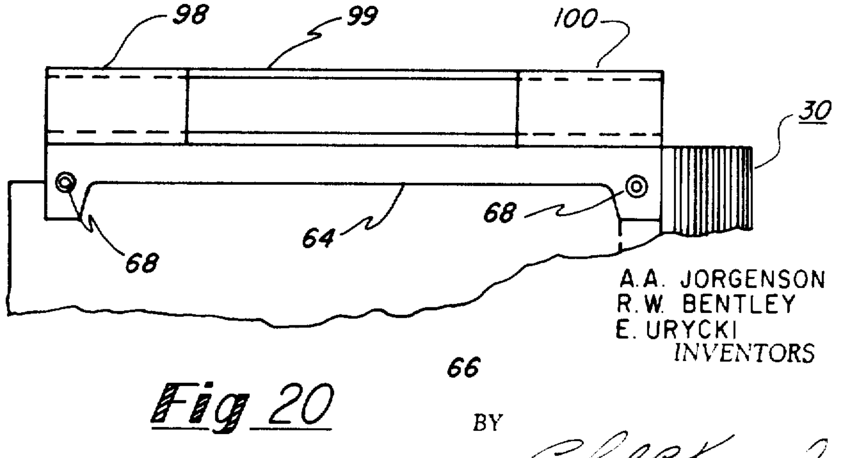
Fig 21 Fig 20
A.A. JORGENSON
R.W. BENTLEY
E. URYCKI
INVENTORS
66
BY
ATTORNEY A. A. JORGENSON
R. W. BENTLEY
E. [illegible]
INVENTORS

BY

ATTORNEY

PRINTED CIRCUIT CARD ARRANGEMENT

This application is a continuation-in-part of a U.S. Pat. application, Ser. No. 809,072, entitled "Printed Circuit Card Arrangement With Support Frame And Support Assembly" filed on Mar. 21, 1969, for A.A. Jorgensen, R.W. Bentley and E. Urycki.

The present invention relates in general to printed circuit card arrangements and more particularly to a printed circuit card stiffener frame and guide pin arrangement associated with a printed circuit card module.

In an effort to reduce the size of complex electronic systems great attention has been focused through the years on the fabrication of printed circuit modules which may be physically mounted in closely spaced relationship to provide an extremely compact organization of plural circuits or systems. However, further efforts to additionally decrease the size of such modules have encountered difficulties with assembly of the printed circuit arrangements, alignment of the elements, proper registration between the printed circuit boards and associated connector elements, and proper spacing and insulation between the respective circuits, among the numerous difficulties.

Printed circuit card modules have been provided in numerous forms in an attempt to overcome the aforementioned difficulties and also to provide for accessibility and ease of repair of the individual circuits included in the arrangement. Arrangements such as the "Book-type" module wherein the boards are positioned in closely spaced relationship and hinged along a common edge so as to provide accessibility to the interior boards, much in the same manner as the pages of a book, have been developed to satisfy the requirement of accessibility. Other arrangements have provided both horizontal and vertical stacks of boards oriented through more or less complicated spacing and aligning elements so as to provide proper spacing and alignment between the respective boards and the associated electrical connector elements.

However, in spite of the progress that has been made over the years in connection with such printed circuit card modules, difficulties relating to interchangeability of individual boards so as to provide simplified circuit modification, simplified assembly and disassembly for purposes of initial manufacture and subsequent repair, and accuracy in alignment between the respective boards and registration between the boards and the associated connector elements have proven to be ever present problems.

Accordingly, the present invention provides a printed circuit card stiffener frame and guide pin arrangement in association with a printed circuit card module which tends to more closely achieve the aforementioned objectives than those arrangements of a similar nature which have been provided heretofore.

In addition, the objects of the present invention are achieved most notably with relatively simple means which provide for economy of manufacture, simplicity of assembly and dependability in use.

In accordance with the present invention there is provided a printed circuit card module wherein printed circuit cards of varying lengths may be selectively combined to produce a stack of equally spaced parallel vertically disposed card assemblies. The card assemblies include a printed circuit card bounded by a framework of stiffening members which add rigidity to the card during the handling and assembling, with oppositely disposed side frame members forming a guide pin arrangement for supporting the card in conjunction with a support frame or gate.

One important feature of the present invention relates to a stiffener frame for a printed circuit card, which frame is composed of rigid metal frame elements bounding the card on all sides and providing a rigidity thereto which permits extremely close spacing between the card assemblies while assuring proper alignment of the cards in the overall module. One frame element forming the front stiffening member for the card serves also as a designation strip holder and support surface for lamps, switches, test jacks, potentiometers, etc. which may be mounted to or projected through cut-outs after the components have been fixed to the printed circuit card. This frame element may also provide a front projecting flange that serves as a handle to facilitate the installation or the removal of the card from the gate assembly.

An especially important feature of the present invention resides in provision of side frame elements for the printed circuit card which include a captive male screw stud encased in such a manner as to engage upper and lower female guide studs supported on the mounting gate or shelf frame upon which the cards are supported in the gate assembly. Channels in the upper and lower side frame elements permit insertion of a screw driver to effect engagement between the male screw stud and the female guide stud which not only provides for locking of the circuit card to the frame or gate, but also effects an engagement, and in the reverse operation a disengagement, of the circuit card connector element with the accompanying connector element mounted on the frame or gate.

These and other features and advantages of the present invention will become more apparent from the following detailed description thereof when taken in conjunction with the accompanying drawings, which illustrate one exemplary embodiment of the present invention, and wherein:

FIG. 17 is a side view of a portion of the printed card assembly including a fourth embodiment of the guide members on the card;

FIG. 18 is an end view of FIG. 17;

FIG. 19 is a top view of FIG. 17;

FIG. 20 is a side view of a portion of the printed card assembly including a fifth embodiment of the guide members on the card;

FIG. 21 is an end view of FIG. 20; and

FIG. 22 is a top view of FIG. 20;

FIG. 24 is an end view of a portion of the printed card assembly including a seventh embodiment of the guide members on the card.

For purposes of providing a complete disclosure of the present invention, an exemplary embodiment thereof will now be set forth in detail; however, it should be understood that various modifications and changes in the construction and arrangement of elements may be effected in an obvious manner by one of ordinary skill in the art without departing from the spirit and scope of the invention.

Figures 1, 6, 7:
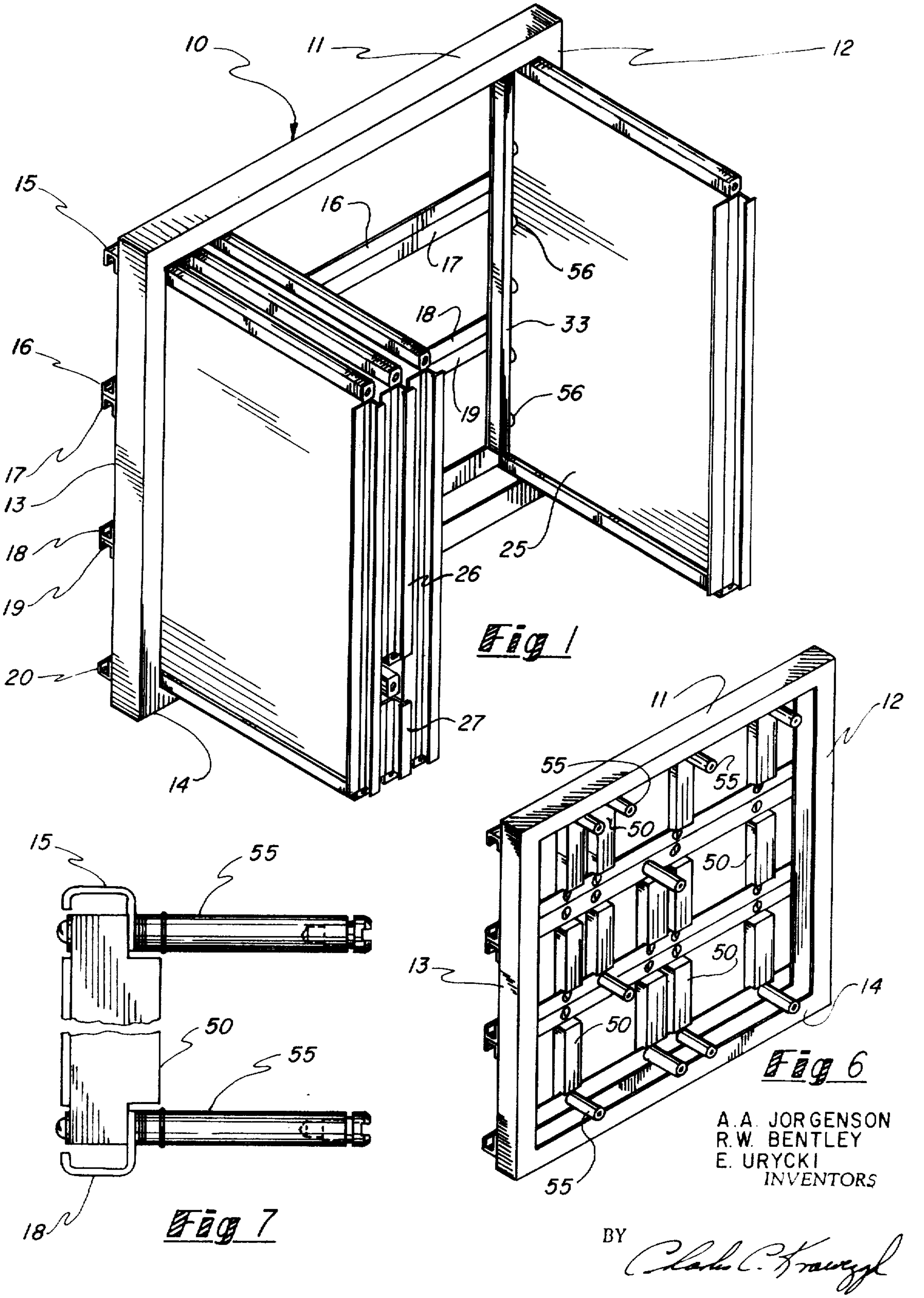
FIG. 1 is a general perspective view showing the gate assembly of printed circuit cards as provided in accordance with the present invention.
FIG. 6 is a detailed illustration of the gate upon which the individual printed circuit card assemblies are mounted.
FIG. 7 is a detailed illustration of the connector and guide stud arrangement provided on the gate assembly.
Figure 2:
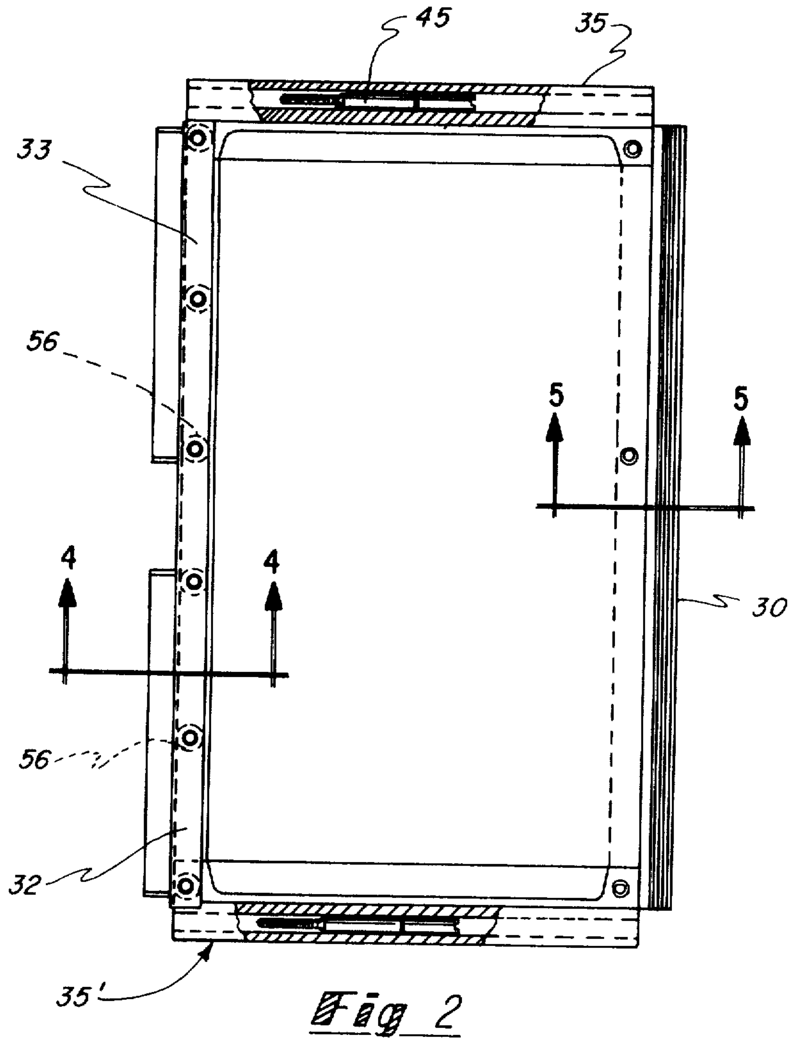
FIG. 2 is a side plan view of a typical printed circuit card assembly in accordance with the present invention.

FIG. 1 provides a general view of the gate assembly in accordance with the present invention illustrating the versatile use of printed circuit cards of varying length to provide a module arrangement of circuits in a compact assembly. The gate or shelf is generally designated at 10 as being substantially rectangular in configuration and having respective side portions 11, 12, 13, and 14. In addition, connector mounting bars 15–20 are secured to the rectangular gate, serving as support elements for the connectors and guide studs, and will be described in greater detail hereinafter.

The printed circuit card assemblies are supported on the gate or shelf in a vertical closely spaced parallel relationship so as to provide a stack or block of printed circuit cards in an assembly. As apparent from FIG. 1, due to the presence of the mounting bars, such as 16 and 17, at intermediate positions between the end gate elements 11 and 14, it is possible to support printed circuit cards of intermediate length at the gate or shelf pin. For example, while the printed circuit card 25 is of full length extending all the way between the opposite gate elements 11 and 14, the printed circuit card 26 is only two-thirds of full length being supported between the mounting bars 11 and 18. In a like manner, the circuit card 27 provides only one-third of the full circuit card length, being supported between the mounting bars 19 and 20. In this way, many combinations of circuit cards of varying length may be supported in the modular assembly so as to provide for separation of the circuit subassemblies and replacement of circuit cards with one or more cards of different size in a relatively simple manner.

Looking now more closely to FIGS. 2, 3, 4 and 5, the printed circuit card stiffener frame in accordance with the present invention consists of a front frame member 30, a rear frame member 32 and upper and lower frame members 35 and 35'. The frame members 30, 32 and 35 and 35' are secured to one another and to the printed circuit card so as to form a rigid frame completely surrounding the card. The individual frame members, which may consist of extruded, aluminum sections, are attached in a predetermined fashion to the printed circuit card through the use of metal rivets or other known fastener elements.

Figure 3:
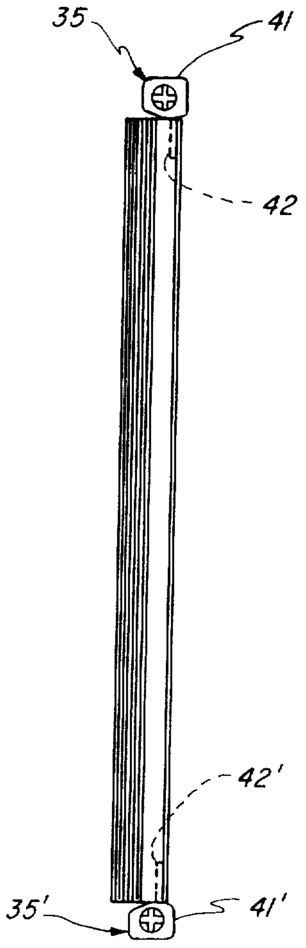
FIG. 3 is an end view of the printed circuit card assembly of FIG. 2.

The side view of the printed circuit card arrangement illustrated in FIG. 3 shows the configuration of the upper and lower frame members 35 and 35', which are essentially identical in configuration. These frame members consist of a substantially rectangular hollow channel portion 41 and an integral transversely extending stiffener or support portion 42 which is secured directly to the printed circuit card by way of rivets or other suitable fastening means 52. The support portions 42 and 42' of the frame members 35 and 35' are provided in the form of projections at the respective ends of the frame member so as to provide for a securing of the hollow channel portions 41 and 41' to the printed circuit card. Within the hollow of the channel portions 41 and 41' there is provided a captive male screw stud 45 incased in the hollow channel portion with a washer or key preventing longitudinal translation of the screw stud while permitting rotation thereof. Thus, the printed circuit card assembly can be mounted on a gate or other support by sliding the upper and lower channel sections 50 onto suitable guide studs, in a manner to be described in greater detail hereinafter.

Figure 5:
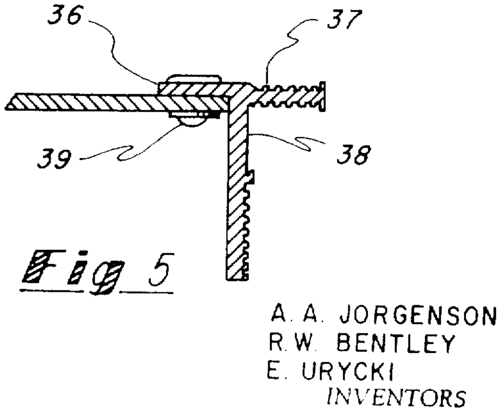
FIG. 5 is a section of the printed circuit card assembly taken along line 5—5 of FIG. 2.

FIG. 5 illustrates in detail a section of the front frame member 30 which includes a support extension 36, a forwardly extending handle portion 37, and a transversely extending designation strip portion 38. The support extension 36 is secured directly to the printed circuit card by way of a rivet or other fastener 39 so that the handle portion 37 projects forwardly providing a means for gripping a circuit card to remove or place the card in position in the printed module. The transversely extending designation strip portion 38 provides a surface for lamps, switches, test jacks, potentiometers, etc. to either be mounted to or project through after these components have been fixed to the printed circuit card.

Figure 4:
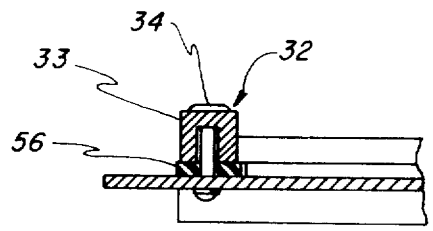
FIG. 4 is a section of the printed circuit card assembly taken along line 4—4 of FIG. 2.

FIG. 4 illustrates a section of the rear frame member 32 which consists of a U-shaped channel 33 mounted with the legs engaging a plurality of insulating washers or spacers 56 that space the frame member 32 from the conductors on the printed circuit board and secured thereto by means of a rivet or other fastener 34 extending through the board and the washer 56 from the base portion of the channel member. As noted in the Figure, a portion of the circuit board extends beyond the frame member 32, and this section preferably provides the contacts which are inserted into the female connector strips mounted in the gate or shelf assembly. Due to the particular U-shaped configuration of the frame member 32, the edge of the printed circuit card which is to be inserted into the female connector strips is supported with extreme rigidity so as to prevent flexing of the cards which might in some way provide for difficulty in alignment between the contacts on the printed circuit card and the connector strip arrangement.

The gate or shelf which provides for support of the printed circuit assembly and the manner of support of the individual boards thereon is illustrated in greater detail in FIG. 6. The connector mounting bars 15–20 are each provided with apertures along the length thereof which are aligned in the vertical direction so as to accommodate the fasteners for individual plug-in-type connectors 50 which are supported vertically in the frame to receive the terminal edge of associated printed circuit cards. The connectors 50 will locate precisely on the gate between the punched connector mounting bars in accordance with the desired size and location of the various printed circuit cards to be mounted in the module, which connectors are then secured in place by suitable fasteners. Also secured to the connector mounting bars 15–20 are the plurality of female guide studs 55 positioned at the ends of a connector strip, or row of connector strips depending on the size of the cards to be mounted in position thereat. These guide studs 55 also cooperate with the fastener for the connector strip to thereby provide the means for holding the connector strip on the connector mounting bar as seen in FIG. 7. The female guide studs 55 are provided in locations representing the upper and lower edges of the individual printed circuit cards to be mounted on the gate 10, and as already described cooperate with the channels in the frame members 35 and 35' to support the individual card assemblies at the respective upper and lower horizontal edges thereof. Thus, these female guide studs will properly locate the various printed circuit cards and support the cards in spaced parallel relationship. As seen in FIG. 7, the guide studs 55 are provided with a female threaded portion at both ends thereof with one end corporating with the fastener for the connector element to secure the connector element to the connector mounting bar. The free end of the guide stud also is provided with a female threaded portion to accommodate a securing member mounted in the printed circuit card frame.

In assembling the cards on the gate or frame the printed card assembly is supported with a pair of guide studs 55 inserted into the channels of the upper and lower frame members 35 and 35' of the card, which is then physically pushed in until the end of captive screw 45 butts against the female threaded portion of the locating guide stud 55 secured on the gate. A hand screw-driver or similar device is then used to engage the male and female threads which will draw the card, through the use of the captive screw stud, into its home position in engagement with the fixed connectors 50. In the same manner, the cards can be easily extracted from their seated position thereby eliminating the use of intricate card extractor tools or brute force to engage or disengage the card. The use of a threaded connection between the printed card assembly and the mounting frame or gate adds a rigidity to the entire module and insures proper location of each printed circuit guide at all times in the required connector element.

In addition, since the guide studs 55 are precision located on the mounting gate or shelf frame, the position of these guide studs being directly related to the printed circuit card connectors by means of the connector mounting holes, accurate location of the cards in relation to the connectors is ensured. The location of these studs will be pre-determined in such a manner as to facilitate mounting the various multiple or individual cards in a mixed configuration with the precision required to maintain the necessary close spacing between the various cards of the module.

Figure 8:
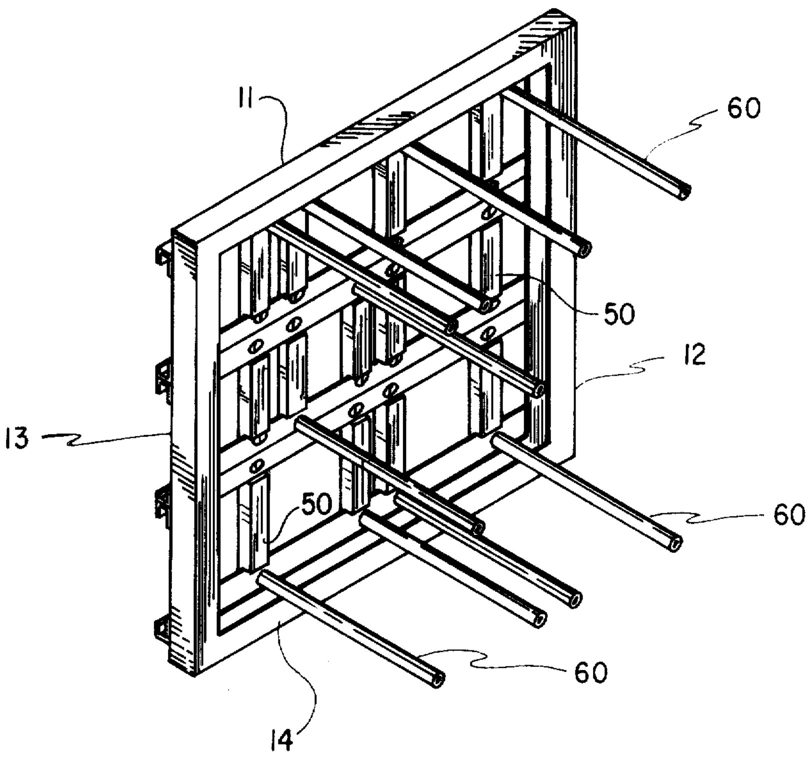
FIG. 8 is a detailed illustration of the gate including elongated guide studs.
Figure 9:
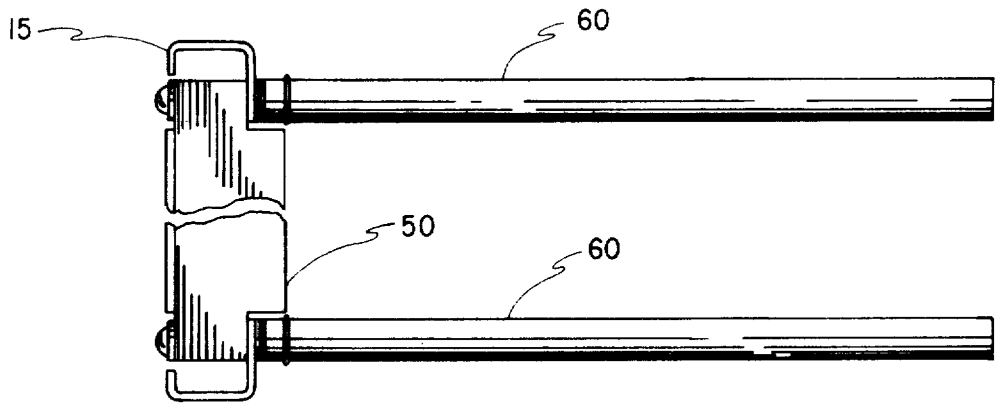
FIG. 9 is a detailed illustration at the connector and guide stud arrangement including the elongated guide studs.

FIGS. 8 and 9 include a modified gate arrangement wherein elongated guide studs 60 replace the short stud 55 of FIGS. 6 and 7. Except for the guide studs 60, the reference numbers of FIGS. 6 and 7 apply to the same elements in FIGS. 8 and 9. The elongated guide studs cooperate with the card guide elements of FIGS. 10–22 to allow the printed circuit card to be properly plugged into the connectors 50.

Although one frame element is illustrated in each of FIGS. 10–22, it is to be understood that another similar frame element is mounted on the opposite side of the card. Each of the frame elements of FIGS. 10–22 include an elongated stiffener portion 64 that extends along the side of the card 66 and is suitably fastened at one end to the card, and at the other end to the card front frame member 30 through the use of meal rivets 68 or other known fastener elements. In the smaller size cards a three sided stiffener frame is sufficient to render the card substantially inflexible. In such case the U-shaped channel frame member 33 (FIGS. 2 and 4) may be left out. On the other hand, when the stiffener frame is used with a larger sized card, the U-shaped channel 33 is fastened across the contact end of the board, as previously described with regards to FIGS. 2 and 4, and attaches to the stiffener portion 64 as illustrated in FIG. 12.

Figures 10, 11, 12, 13, 14, 15, 16:
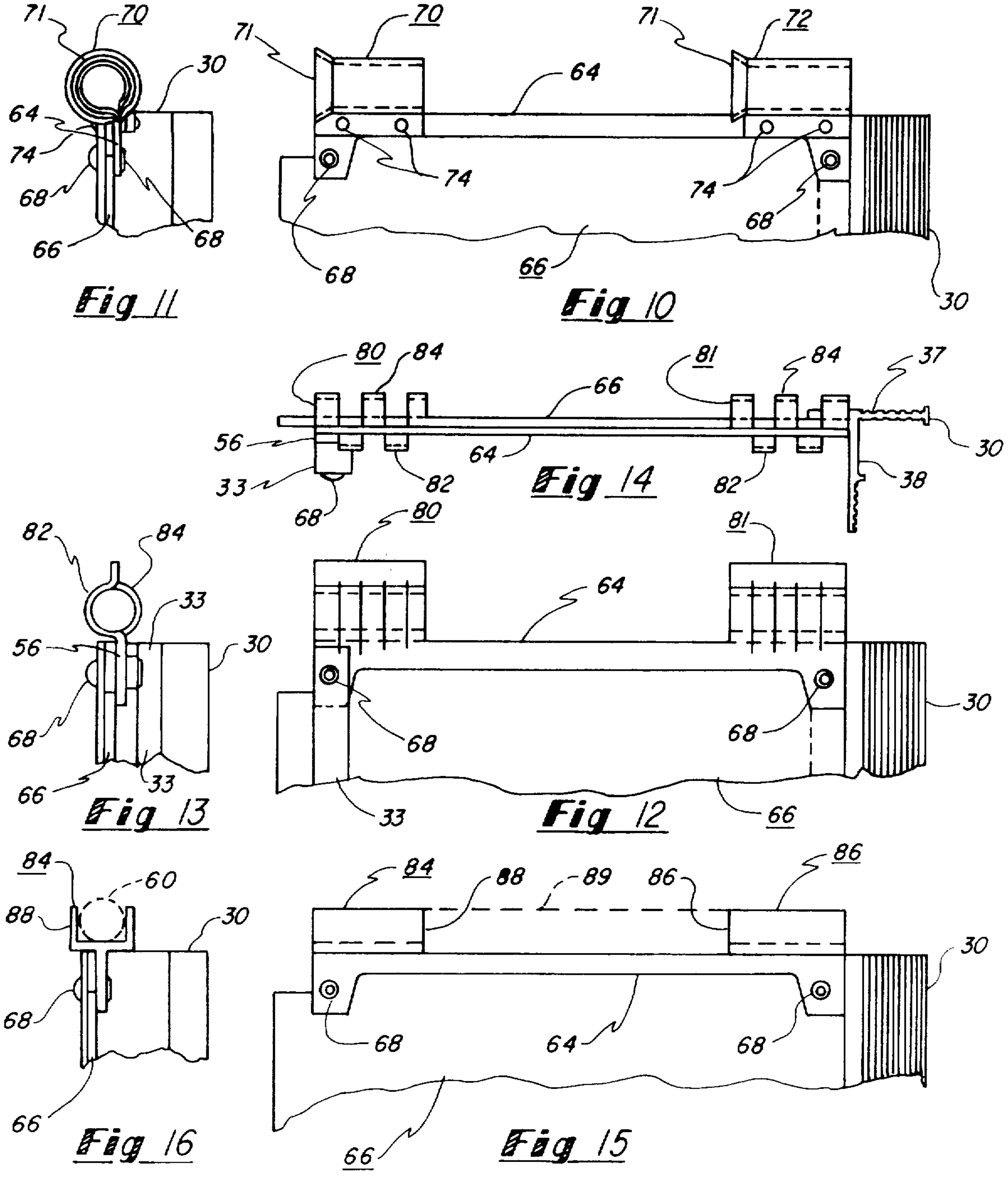
FIG. 10 is a side view of a portion of the printed card assembly including a second embodiment of the guide members on the card.
FIG. 11 is an end view of FIG. 10.
FIG. 12 is a side view of a portion of the printed card assembly including a third embodiment of the guide members on the card.
FIG. 13 is an end view of FIG. 12.
FIG. 14 is a top view of FIG. 12.
FIG. 15 is a side view of a portion of the printed card assembly including a third embodiment of the guide members on the card.
FIG. 16 is an end view of FIG. 15.

The frame member of FIGS. 10 and 11 include two identical axially aligned circular tubular guide members 70 and 72 fastened to the stiffener portion 64 and the card 66 by rivets 74. Each of the guide members 70 and 72 include a flanged opening 71 along the end of the guide member facing the portion of the card including the printed circuit contacts for providing a converging guide for receiving the guide stud 60. The two guide members 70 and 72 essentially define a cylindrical tubular channel extending along the length of the side of the card to receive and hold a guide stud 60 and mount the card in place. It is to be understood, that a single tubular guide channel that extends along the length of the card side could also be used instead of the two separate members. Furthermore, the guide members 70 and 72 and the stiffener portion 64 can comprise a single molded integral unit as illustrated in the frame member of FIG. 12 rather than separately fastened parts.

The frame member of FIG. 12 includes two identical generally flat axially aligned guide members 80 and 81 and the stiffener portion 64 formed as an integral unit which is attached to the frame members 30 and 33 and card 66 by rivets 68. The guide members 80 and 81 are formed with a plurality of semicircular rib members 82 and 84 that extend alternately in opposite directions transverse to the flat guide members to define a cylindrical channel therethrough (as illustrated in FIG. 13) that extends along the end of the card 66. It is to be understood that the frame member of FIG. 12 can include a single guide member extending along the entire side of the card with a plurality of semicircular rib members formed along the length of the card side. In addition, the ribs can have a variety of shapes, such as for example, V-shaped or square and still provide the elongated hollow channel.

The frame member of FIGS. 15–19 include two axially aligned guide members 84 and 86 having an open side and are molded as an integral unit with the stiffener portion 64. The guide members 84 and 86 of FIGS. 15 and 16 include a square U-shaped bracket 88 that is attached to the support portion 64 so that the opening extends out from the end of the card 66. The square type U-shaped bracket 88 engages the stud 60 at three points (as illustrated in dashed lines in FIG. 16) and functions as a guide for sliding along the stud to mount the printed circuit card into place. It is to be understood the bracket 88 can be modified to have a semicircular shape or V-shape 87 as shown in FIG. 24 and the guide members 84 and 86 can also be modified to form a single unit extending along the entire length of the side of the card as illustrated by the dashed line 89 in FIG. 15.

The frame member of FIGS. 17–19 include a pair of guide members 90 and 92 integrally connected to the stiffener portion 64. The guide members 90 and 92 include a plurality of curved fingers 94 and 96 that alternately extend from the end of the card 66 to define a U-shaped guide along the end of the card as illustrated in FIG. 19 for engaging the stud 60 (as illustrated by dashed lines in FIG. 19). It is to be understood the frame member of FIGS. 17–19 can be changed, if desired, to provide the plurality of fingers 94 and 96 that extend along the entire length of the side of the card to provide a continuous guide and to have the square shape of FIG. 16 or can be modified to have a V-shape or square shape (as in FIG. 16).

The frame member of FIGS. 20–22 includes three axially aligned guide members, 98, 99 and 100 spaced along the side of the card end and are formed as an integral portion of the stiffener portion 64. The guide members 98 and 100 include a square C-shaped bracket having an opening extending in a direction transverse to the card 66 and opposite to a square C-shaped bracket of the guide member 99. The square C-shaped brackets define a square channel that extends along the length of the side of the card for receiving and holding the stud 60, (as designed in dashed lines in FIG. 21). Although only three guide members have been illustrated, it is to be understood that arrangement can be modified to include any number of such elements depending upon the design requirements (at least two are required). Furthermore, the corners of the guide members 102 and 104 can be attached to provide a stronger structure in the event the frame member is to be constructed of molded plastic, or can be separated in the event that formed metal parts are used. In addition to the foregoing, the C-shaped brackets can be semicircular in form or can be modified to V-shaped brackets.

In each of the frame members of FIGS. 10–22, the guide members can form an integral part of the stiffener portion 64 as illustrated in FIGS. 12–22 or the guide members can be separate parts suitably fastened to the card and frame as illustrated in FIGS. 10 and 11. In the arrangement for each of the FIGS. 10–22, the support frame can include three support portions (FIGS. 10 and 11 and FIGS. 15–22) or can include the fourth support portion 33 of FIGS. 12–14. In addition to the foregoing, the guide members can comprise a plurality of elements separately spaced along the card edge or else one continuous unit running along the length of the edge of the card.

Figure 23:
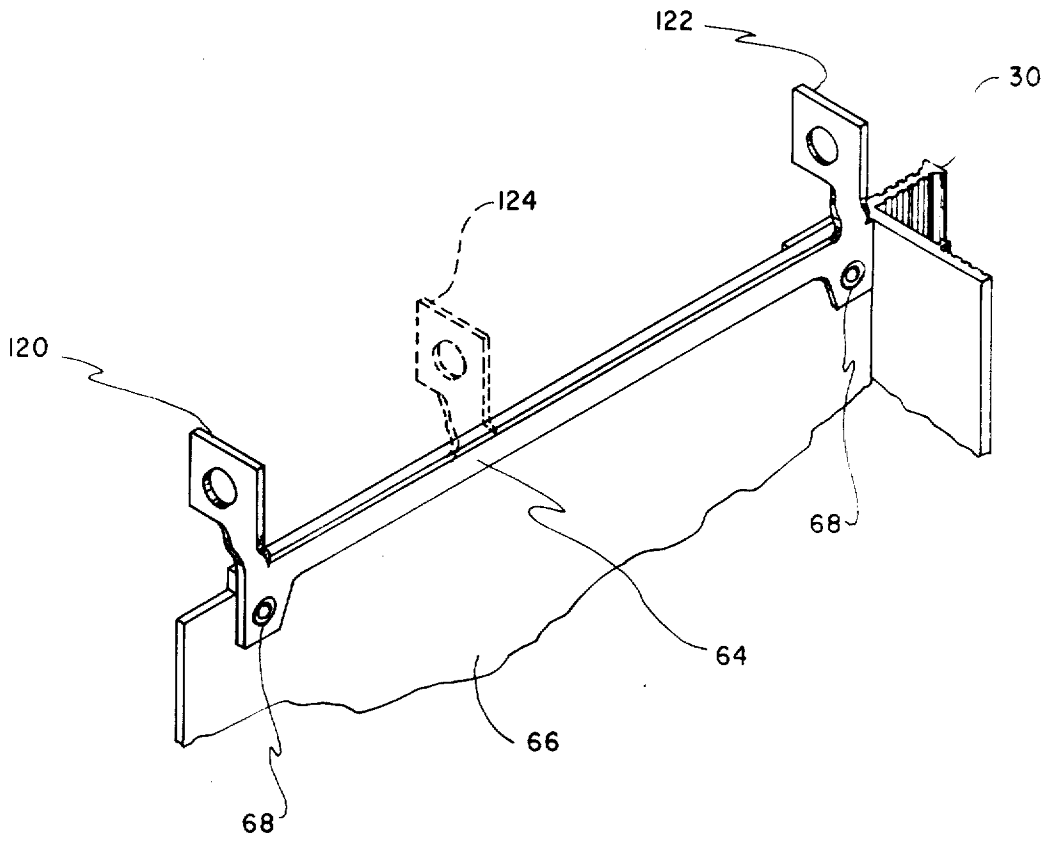
FIG. 23 is an isometric view of a portion of the printed circuit card assembly including a sixth embodiment of the guide members on the card.

The frame member of FIG. 23 includes two identical generally flat aligned guide members 120 and 122 that are formed as an integral portion of the stiffener portion 64 and are attached to the frame member 30 and the card 66 by the rivets 68. The flat guide members 120 and 122 extend outward from the edge of the card in a direction generally normal to the plane of the card. If desired, a third flat member 124 (as shown in the dashed line) can be added. The flat members 120, 122 and 124 are formed with an aperture defining a channel for receiving the guide stud and mounting the printed circuit board. The aperture can be of any shape, such as circular (as illustrated) or square, triangular, etc., so as to provide the desired guiding arrangement with the stud 66. In addition to the foregoing, the flat members 120–124 can be modified to include a U-shaped or V-shaped opening extending out from the card as illustrated with regards to the guide members of FIGS. 15–19 and FIG. 24.

What is claimed is:

1. A printed circuit card arrangement comprising:

a printed circuit card for carrying a printed circuit and electrical components connected thereto, and having a plurality of contacts adjacent an end of said card;

a stiffener frame including at least three members fastened to said card adjacent at least three ends of said card for rendering said card substantially inflexible, and wherein said plurality of contacts extend beyond said frame, and two opposite sides of said frame are substantially parallel to the plane of said card and have an end adjacent said card end having contacts, wherein each side includes at least two hollow channel guides, each formed with a flanged opening facing said contact card end, and wherein the channel guides define a pair of hollow channels extending along the opposite sides of the card for mounting said card.

2. A printed circuit card arrangement as defined in claim 1 wherein:

the third member of said stiffener frame is fastened adjacent the end of the card opposite the contact end and includes a further portion extending traversely to said card for carrying circuit elements.

3. A printed circuit card arrangement as defined in claim 2 wherein:

the stiffener frame includes a fourth member extending along one side of the card adjacent the contact end and spaced from said card side.

4. A printed circuit card arrangement comprising:

a printed circuit card for carrying a printed circuit and electrical components connected thereto, and having a plurality of contacts adjacent an end of said card;

a stiffener frame including at least three members fastened to said card adjacent three ends of said card for rendering said card substantially inflexible, and wherein said plurality of contacts extend beyond said frame, and two opposite sides of said frame are substantially parallel to the plane of said card and have an end adjacent said card end having contacts, wherein each side includes at least one substantially flat member extending from said frame substantially parallel to the plane of said card formed with a plurality of curved rib members extending outward from said member to define a channel therethrough extending along the card for mounting said card.

5. A printed circuit card arrangement defined in claim 4 wherein said ribs have a generally semicircular shape and wherein adjacent ribs extend in opposite directions.

6. A printed circuit card arrangement as defined in claim 4 wherein said ribs have a generally V-shape and wherein adjacent ribs extend in opposite directions.

7. A printed circuit card arrangement as defined in claim 5 wherein at least two flat members are included on each side with their channels positioned in axial alignment.

8. A printed circuit card arrangement as defined in claim 4 wherein:

the third side of the said stiffener frame is fastened adjacent the end of the card opposite the contact end and includes a further portion extending traversely to said card for carrying circuit elements.

9. A printed circuit card arrangement as defined in claim 8 wherein:

the stiffener frame includes a fourth member extending along one side of the card adjacent the contact end and spaced from said card side.

10. A printed circuit card arrangement comprising:

a printed circuit card for carrying a printed circuit and electrical components connected thereto and having a plurality of contacts adjacent an end of said card;

a stiffener frame including at least three members fastened to said card adjacent at least three ends of said card for rendering said card substantially inflexible, and wherein said plurality of contacts extend beyond said frame, and two opposite sides of said frame are substantially parallel to the plane of said card and have an end adjacent said card end having contacts, wherein each side includes at least one member having a groove formed in said member extending outward from said card defining a guide for mounting said card.

11. A printed circuit card arrangement as defined in claim 10 wherein said groove includes a U-shaped channel having a generally square shaped bottom.

12. A printed circuit card connector as defined in claim 10 wherein said groove includes a U-shaped channel having a generally rounded bottom.

13. A printed circuit card connector as defined in claim 11 wherein said groove includes two axially aligned U-shaped channel members along each card side.

14. A printed circuit card connector as defined in claim 12 wherein said groove includes two axially aligned U-shaped channel members are provided along each card side.

15. A printed circuit card connector as defined in claim 10 wherein said groove includes a U-shaped channel member having a plurality of curved fingers alternately extending in opposite directions to define a U-shaped channel.

16. A printed circuit card arrangement as defined in claim 10 wherein:

the third member of said stiffener frame is fastened adjacent the end of the card opposite the contact end and includes a further portion extending traversely to said card for carrying circuit elements.

17. A printed circuit card arrangement as defined in claim 15 wherein:

the stiffener frame includes a fourth member extending along one side of the card adjacent the contact end and spaced from said card side.

18. A printed circuit card arrangement comprising:

a printed circuit card for carrying a printed circuit and electrical components connected thereto, and having a plurality of contacts along an end of said card;

a stiffener frame including at least three members fastened to said card adjacent at least three ends of said card for rendering said card substantially inflexible, and wherein said plurality of contacts extend beyond said frame, and two opposite sides of said frame are substantially parallel to the plane of said card and have an end adjacent said card end having contacts, wherein each side includes a plurality of C-shaped brackets wherein the opening of said brackets extend in a direction generally normal to the card and the opening of adjacent brackets extend in opposite directions to define a channel therethrough extending along the side of the card, parallel to the plane of the card, for mounting said card.

19. A printed circuit card arrangement as defined in claim 18 wherein the C-shaped brackets have a generally semicircular shape to define a circular channel.

20. A printed circuit card arrangement as defined in claim 18 wherein the C-shaped brackets have a generally square shape to define a square channel.

21. A printed circuit card arrangement as defined in claim 18 wherein a corner of adjacent C-shaped brackets are attached.

22. A printed circuit card arrangement as defined in claim 18 wherein:

the third member of said stiffener frame is fastened adjacent the end of the card opposite the contact end and includes a further portion extending traversely to said card for carrying circuit elements.

23. A printed circuit card arrangement as defined in claim 22 wherein:

the stiffener frame includes a fourth member extending along one side of the card adjacent the contact end and spaced from said card side.

24. A printed circuit card arrangement comprising:

a printed circuit card for carrying a printed circuit and electrical components connected thereto, and having a plurality of contacts along an end of said card, a stiffener frame including at least three members fastened to said card adjacent at least three ends of said card for rendering said card substantially inflexible, and wherein said plurality of contacts extend beyond said frame, and two opposite sides of said frame are substantially parallel to the plane of said card and have an end adjacent said card end having contacts, wherein each side includes a plurality of V-shaped brackets wherein the opening of said brackets extend in a direction generally normal to the card and the opening of adjacent brackets extend in opposite directions to define a channel therethrough extending along the side of the card, parallel to the plane of the card, for mounting said card.

25. A printed circuit card arrangement comprising:

a printed circuit card for carrying a printed circuit and electrical components connected thereto, and having a plurality of contacts adjacent an end of said card;

a stiffener frame including at least three members fastened to said card adjacent at least three ends of said card for rendering said card substantially inflexible, and wherein said plurality of contacts extend beyond said frame, and two opposite sides of said frame are substantially parallel to the plane of said card and have an end adjacent said card end having contacts, wherein each side includes at least two generally flat members extending outward from said frame in a direction generally normal to the plane of said card and wherein said flat members are formed with an opening therethrough in axial alignment to provide a guide for mounting said card.

26. A printed circuit card arrangement as defined in claim 25 wherein said substantially flat members are formed with an enclosed aperture.

27. The printed circuit card arrangement as defined in claim 25 wherein said opening is in the form of a U-shaped aperture having its opening extending outward from said card.

28. The printed circuit card arrangement as defined in claim 25 wherein said opening is in the form of a V-shaped aperture having its opening extending outward from said card.

* * * * *

UNITED STATES PATENT OFFICE

CERTIFICATE OF CORRECTION

PATENT NO. : 3,676,747

DATED : July 11, 1972

INVENTOR(S) : Adam A. Jorgensen, et al.

It is certified that error appears in the above-identified patent and that said Letters Patent are hereby corrected as shown below:

Col. 5, line 27 "meal" should read ---metal---.

Signed and Sealed this

*twenty-first* Day of *October 1975*

[SEAL]

*Attest:*

RUTH C. MASON
*Attesting Officer*

C. MARSHALL DANN
*Commissioner of Patents and Trademarks*